Jan. 19, 1971 T. LOEW 3,556,924

CUSHIONING MEMBERS AND METHODS OF MAKING THE SAME

Filed Nov. 24, 1967 2 Sheets-Sheet 1

INVENTOR.
THEODORE LOEW

BY [signature]

ATTORNEY

CUSHIONING MEMBERS AND METHODS OF MAKING THE SAME
Filed Nov. 24, 1967 2 Sheets-Sheet 2
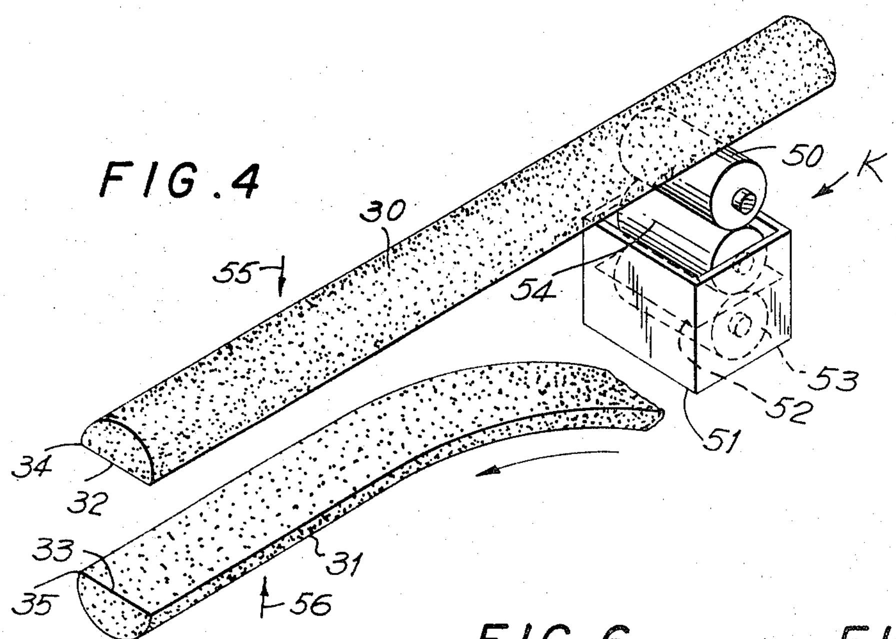
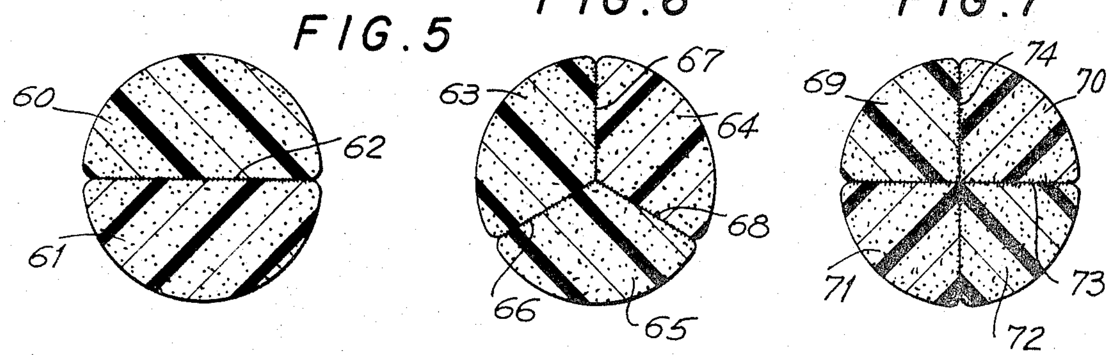
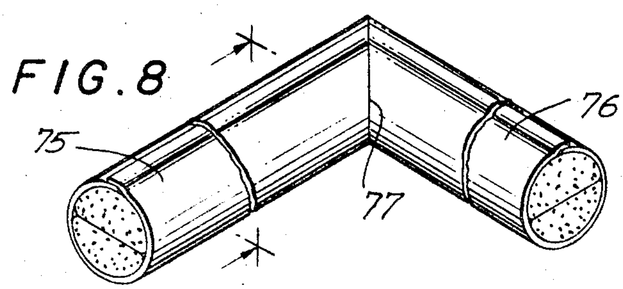
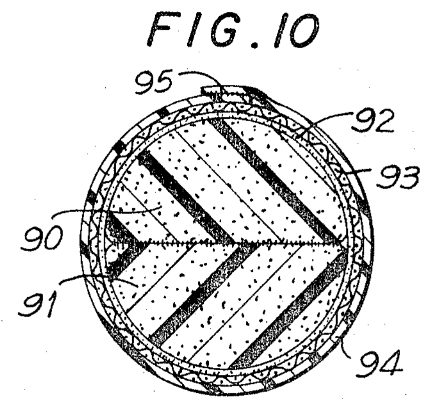
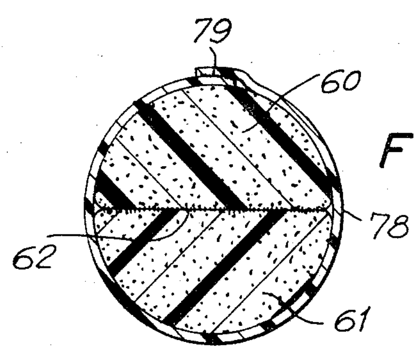
INVENTOR.
THEODORE LOEW
BY
ATTORNEY United States Patent Office 3,556,924

Patented Jan. 19, 1971

3,556,924

CUSHIONING MEMBERS AND METHODS OF MAKING THE SAME

Theodore Loew, Schenectady, N.Y., assignor to Cee Bee Mfg. Co., Inc., Brooklyn, N.Y., a corporation of New York Filed Nov. 24, 1967, Ser. No. 685,576
Int. Cl. B32b 3/26, 31/08
U.S. Cl. 161—160 8 Claims

ABSTRACT OF THE DISCLOSURE

The disclosure describes a method of making elongated cushioning members for the interior of vehicles, particularly automobiles, and for other purposes, in which strips of polyvinyl foam are formed by means of putting a foaming agent in vinyl plastisols. The plastisol is fed upon a heat resistant belt, whether it be paper or fabric, and this belt is passed through an elongated heating chamber to cause a swelling or puffing up of the thin layer of vinyl polymer usually into an externally rounded shape.

The foam vinyl polymer is stripped from the carrier and then 1, 2, 3, 4 or more strips are welded or adhesively connected together to form a central cushioning member. This cushioning member may be used as such or it may be wrapped in reinforcing and decorative sheets which may be of thermoplastic materials to permit suitable adhesive attachments to various members, articles, or interior portions of an automobile so that adequate cushioning effect is achieved.

BRIEF SUMMARY AND GENERAL STATEMENT OF THE INVENTION

The present invention relates to the production of cushioning members and it particularly relates to the production of cushioning members for protective purposes, which may be applied to the interior of automobiles or less preferably to the edges of furniture, shelves, tables and other articles to prevent any injury upon abrupt contact with the body.

It is among the objects of the present invention to provide an elongated cushioning member of great effectiveness which may be readily and economically produced at low cost by mass production methods and which may be readily applied by means of adhesive or heat connections in and around automobile interiors, articles of furniture, kitchens, playrooms and to articles likely to cause injury upon violent abrasion.

Another object is to provide a cushioning member of low cost and great effectiveness per unit volume, which may be readily applied to automotive interiors and particularly to the framework around doors, windows and windshield of an automotive vehicle to prevent injury to the driver or occupants upon sudden stops, collisions or other accidents.

A further object is to provide a novel procedure for producing elongated plastic foam material which may be readily employed as cushioning members as against metal supports for automotive doors, windows and windshields, and also in other connections in and about the furniture, household equipment or in rooms or nurseries.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects a plastisol of vinyl polymers containing in liquid form a volatile solvent in amount ranging from 10 to 40%, a plasticizer in amount ranging from 20 to 40%, a nitrogenous foaming agent in amount ranging from 5 to 10% and other small amounts of anti-oxidants and fungicides, is placed upon a heat resistant belt as a centralized layer, the belt being in horizontal position in a thickness of about 1/64 to 1/8 of an inch.

Usually the width of the strip should not exceed 1 to 2 inches, and it may be between 1/2 to 1 1/2 inches in width.

The belt is then passed through an elongated heating chamber or furnace where it may be exposed to a heat gradually increasing from 250° F. up to 350 to 400° F., which is held for about 10 to 20 minutes, or between 5 and 25 minutes. Then the heat of the furnace is gradually decreased until the carrier exits from the elongated furnace at a temperature of about 250 to 300° F.

The highest temperature should be applied 1/3 the travel and in no case more than 1/2 the travel, and the remaining period of exposure should vary from 1/4 to 1/3 the time of total travel. In other words, the belt carrying the vinyl material may be permitted to come up to temperature for the first 5 to 10 minutes of travel, then be held at this temperature for 10 to 15 minutes, and then permitted to cool down for another 5 to 10 minutes before it exits from the heating tunnel.

The belt or carrier has been previously treated with a stripping compound so as to permit the foam which has now been formed to be removed therefrom.

The foam will take a shape depending upon the shape of the belt and it is desirable that it be the shape of a semicylinder with curved edges along the diametral plane. Where a V-shaped belt is used the liquid plastisol containing the foaming agent is deposited in the valley formed by the belt and depending upon the angle of the V-shaped belt, the strip which may be removed from the belt may have on its flat sides which were in contact with the belt an angle of 120, 90 or even 45°.

These stripped lengths of polyvinyl foam are then joined together along their flat faces to give a cylindrical shape with the contacting interfaces being secured, desirably by means of a liquid adhesive or by heating means.

The preferred adhesive where used may be roller coated or brushed on the flattened faces of the strips of polyvinyl foam, immediately before they are pressed together. It is also possible to run the strips together over an electrically heated Teflon coated thin blade or knife or steel, so that an incipient fusion will result which will cause the strips to integrally adhere to one another along their flattened surfaces which have been in coitact with the belt.

Either the junction may be intermittent with the elongated blade being placed between the surfaces to be adhered and then withdrawn after incipient fusion has resulted, or the adhesive has caused the adjacent faces to partly liquify, or if desired the adhesive application may follow the heating application so as to obtain both a combination of fusion adhesive as well as a solvent adhesive. The preferred adhesive consists of a low vinyl polymer dissolved in amount of 40 to 60% in a solution of acetone or acetone and a higher boiling point solvent such as butyl acetate cyclohexanone containing about 5 to 10% of a plasticizer such as octyl phthalate. Desirably a slight compression is applied upon junction to the strips transverse to their contacting faces so that their contacting faces will act as a compression and reinforcing faces extending radially or diametrically through the body of the foam cylinder without affecting its cushioning attributes.

Although cylindrical shapes are desired, it is possible also to obtain elliptical shapes as well as various types of polygonal cross sections such as hexagonal or octagonal cross sections, depending upon the shaping that is given the foaming body, particularly where it is formed of two belts instead of one, the lower belt serving as a carrier belt and the upper belt giving the desired form or shape to the top surface of the vinyl polymer as the foaming and forming take place.

The elongated cushioning member, whether it be cylindrical or other cross sectional shapes, may be cut at angles and joined to other sections by either a hot knife or adhesive solution, or it may be wrapped in a decorative covering with suitable embossed or colored designs, or it may be reinforced by covering it interiorly with a textile knitted or woven fabric or even by a nylon scrim which consists of nylon filaments or threads separated from each other extending both longitudinally and diagonally across from and transversely to each other.

These nylon fibers, threads or filaments are then joined together by means of a thin layer of a vinyl or other thermoplastic adhesive.

Although the wrapper is desirably of a decorative extruded vinyl strip which will be most homogeneous and most adherent to the polyvinyl foam base, other thermoplastic materials may be employed.

It has been found most suitable to use vinyl plastisol foams although in some instances organosols may be employed or other foam and sheet plastics may be used. Where polyurethane foam is employed the temperature may be varied to achieve the desired results and the wrapper may be either of polyurethane sheet or a polyvinyl sheet around the scrim or adhesive which is directly next to and reinforces the surface of the central foam body.

Various types of butadiene-styrene foams may be employed.

The foams may be colored so as to match the color of the article to which they ultimately will be mounted.

BRIEF DESCRIPTION OF THE DRAWINGS

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 4 is a side perspective view indicating the manner of joining the foam strips by means of liquid adhesive material;

FIGS. 5, 6 and 7 are alternative cross sections resulting from different shapes of belts;

FIG. 8 is a diagrammatic perspective view showing the junction of two of the strips at an angle to each other.

FIG. 9 is a transverse sectional view showing the joined strips wrapped together for reinforcement and decorative purposes;

FIG. 10 shows an alternative form of FIG. 9 in transverse cross section indicating interior reinforcement adhesive connections and an exterior wrapper.

DESCRIPTION OF THE PREFERRED EMBODIMENTS

Figure 1:
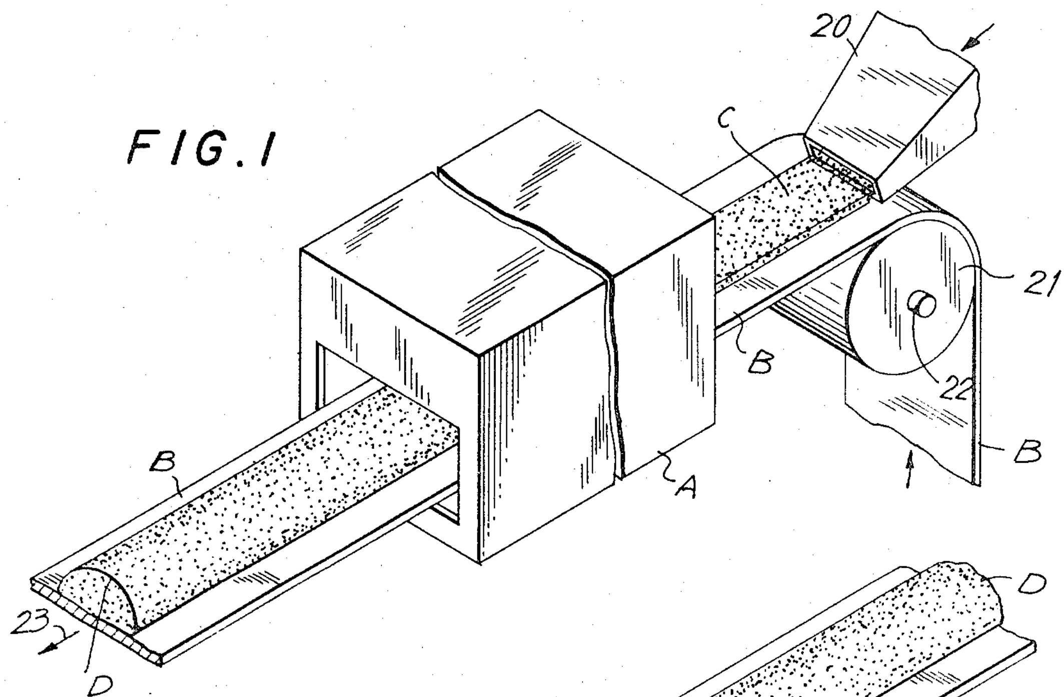
FIG. 1 is a diagrammatic perspective view showing the manner in which the foam is formed upon a carrier and passage through an elongated furnace.
Figure 2:
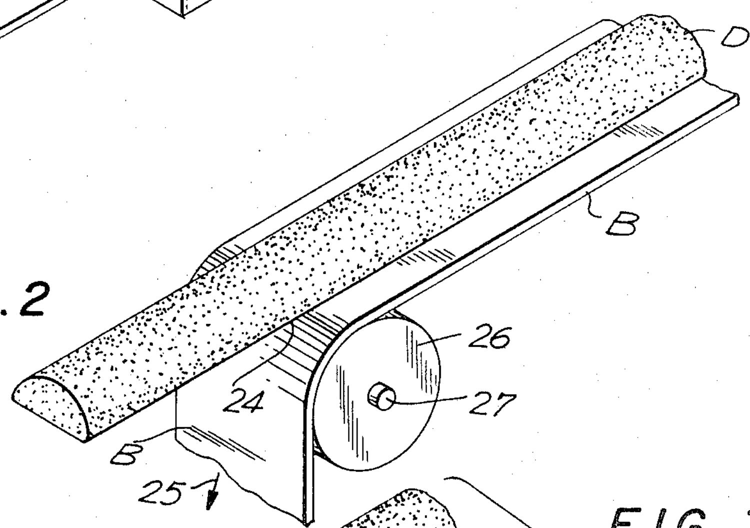
FIG. 2 is a top perspective view showing the stripping of the foamed material of FIG. 1 from the carrier, belt or strip.

Referring to FIGS. 1 and 2, there is shown an elongated heated chamber or furnace A which received the carrier belt B upon which is a centralized layer of vinyl polymer material containing a foaming agent.

The carrier belt B exits with an elevated deposit D of the foam material. As indicated in FIG. 1, the funnel 20 will lay a layer of a liquid vinyl plastisol containing a foaming agent centrally upon the belt which is guided upon the roller 21. The roller 21 will carry the strip B which may be of heat resistant paper or fabric or treated canvas or duck.

The furnace A may be between 3 to 20 or even 40 or 50 feet in length, depending upon the necessary treatment and the temperature of the vinyl material when it is first elevated to optimum foaming conditions and then is held at this condition until foaming is complete and is lowered to somewhat above room temperature at the exit point 23.

In FIG. 2 the belt B carries the foamed material D, which is stripped off the carrier B at 24. The belt or carrier B then moves downwardly as indicated at 25 over the guide roller 26 on the shaft 27.

Figure 3:
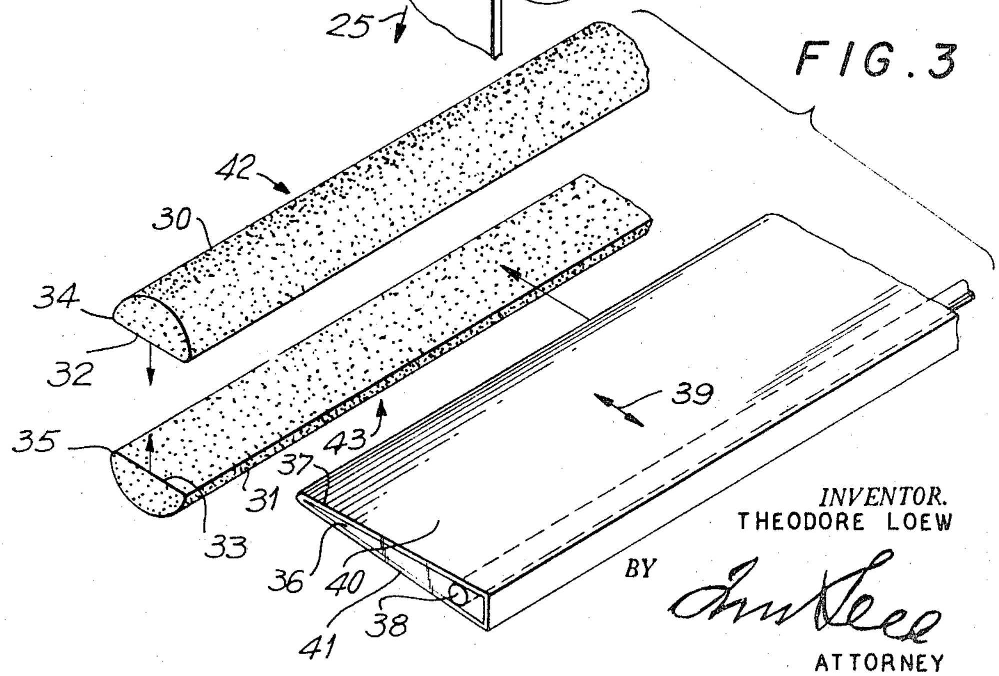
FIG. 3 is a diagrammatic separated view indicating the junction of the foamed strips by means of a reciprocating heated blade or knife.

Referring to FIG. 3, the upper and lower strips 30 and 31 having the contact faces 32 and 33 and the rounded edges 34 and 35 are then treated so that the faces 32 and 33 are subjected to contact with the hot knife 36 having a coating of Teflon 37 and a heating coil 38.

The knife or blade 36 is reciprocated as indicated at the double arrow 39. The elements 31 and 32 will be pressed lightly on to opposite faces 40 and 41 of the coated blade 36 until incipient fusion results. Then the two strips 30 and 31 are pressed together somewhat more forcefully so as to slightly compress them together in a vertical direction as indicated by the arrows 42 and 43.

This will result in a junction between the upper and lower strips 30 and 31 along their faces 32 and 33. The strips 30 and 31 may be caused to contactly pass over or be drawn over the upper and lower faces of the blade 36 or an intermittent motion may be achieved.

In the alternative form of FIG. 4, which may be used by itself or follow the operation of FIG. 3, the upper and lower strips 30 and 31 may be coated on both their contacting faces 32 and 33 by means of roller coaters indicated at K.

The roller coater has an upper roller 50 for applying a thin layer of vinyl adhesive solution to the underface 32 of the strip 30. This adhesive will be picked up from the box or well 51 which carries a pool 52 in which rotates the first roller 53.

The transfer roller 54 will transfer the adhesive solution to the underface 32. The upper face 33 may also be coated in a similar fashion. Then the two strips are pressed together as indicated at 55 and 56 to reduce circularity and also cause an adhesive contact. The results are shown in FIGS. 5, 6 and 7.

In FIGS. 5, 6 and 7 there are shown upper and lower strips 60 and 61 in FIG. 5 joined together by the central adhesive or fused layer 62, or three strips 63, 64 and 65 joined by the adhesive faces or fused junctures 66, 67 and 68, or four strips 69, 70, 71 and 72 joined by the crossing diametral junction faces 73 and 74.

These units, as shown in FIGS. 5, 6 and 7, may be coated if not already colored to match the article on which they are placed, and they may be joined together as indicated in FIG. 6 with the two foamed sections 75 and 76 being joined at an angle 77 by either the hot knife technique of FIG. 3 or the adhesive technique of FIG. 4. This junction technique of FIG. 8 may be applied to single strips or to multiple strips as indicated in FIGS. 5, 6 and 7 or to wrapped strips as indicated in FIG. 9.

In FIG. 9, the joined strips 60 and 61 are wrapped in a sheet of decorative plastic sheeting 78 which is overlapped and adhesively joined at 79. This wrapping may be embossed and otherwise decorated and they are desirably colored so as to match the object on which they are placed.

In FIG. 10 is shown an alternative form in which the interior foam members 90 and 91 are first coated with an adhesive 92 and then with a woven or knitted or scrim reinforcement 93; then they are all wrapped in a decorative vinyl covering 94 overlapped at 95. These strips, as indicated in FIGS. 5–10, may be generally attached to the interior of automotive bodies around door frames and window frames, and to furniture or the interior of rooms by means of either adhesive or fusion attachment.

As many changes could be made in the above cushioning members and methods of making the same, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. An elongated cushioning member having a longitudinal axis and being mountable on an exposed surface to enhance protection against bodily harm upon contact with said exposed surface, said cushioning member being comprised of a plurality of elongated strips of a foamed vinyl polymer, said strips in cross-section having opposed inner faces extending radially of the axis of said cylindrical cushioning member, said opposed inner faces of said strips being bonded together along the longitudinal length thereof, and said strips having substantially arcuate outer surfaces extending longitudinally thereof and together defining a substantially cylindrical surface extending about said axis.

2. The cushioning member of claim 1, wherein said bond between said opposed inner faces of said strips is an integral bond of the foamed vinyl polymer thereof.

3. The cushioning member of claim 1, and a film of thermoplastic material surrounding said substantially cylindrical surface.

4. The cushionin gmember of claim 1, and further including reinforcing cover means surrounding said substantially cylindrical surface and a film of thermoplastic material surrounding said reinforcing cover means.

5. The cushioning member of claim 1, wherein said plurality of elongated strips includes at least three strips which in cross-section define sections of a circle equal to another.

6. A method of making an elongated cylindrical cushioning member comprising, providing movable support means having flat face means, depositing an expansible foamable vinyl polymer material on said flat face means, moving said support means through a heating zone to expand and foam said polymer material to define an elongated strip having a cross-section defining a section of the circle and having at least one radially extending inner face defined by the portion of said polymer material contacting said flat face means of said support means and having a substantially arcuate outer surface defined by unconstrained expansion of said polymer material upwardly from said support means, bonding together the radially extending inner faces of a number of such elongated strips necessary for said arcuate outer surfaces thereof to define a cylindrical outer surface for the cushioning member.

7. In the method set forth in claim 6, covering said cylindrical outer surface with a film of thermoplastic material.

8. In the method set forth in claim 6, covering said cylindrical outer surface with a reinforcing fabric, and covering said reinforcing fabric with a film of thermoplastic material.

References Cited

UNITED STATES PATENTS

| | | | |
|---|---|---|---|
| 2,204,622 | 6/1940 | Reid | 161—101UX |
| 3,117,902 | 1/1964 | Holzheimer | 161—38 |
| 3,325,332 | 6/1967 | Cleereman | 161—160 |

FOREIGN PATENTS

| | | |
|---|---|---|
| 827,605 | 2/1960 | Great Britain. |
| 829,912 | 3/1960 | Great Britain. |

WILLIAM J. VAN BALEN, Primary Examiner

U.S. Cl. X.R.

156—246, 306; 161—101